United States Patent
Boulton et al.

(10) Patent No.: US 10,926,720 B2
(45) Date of Patent: Feb. 23, 2021

(54) RUBBER SPOOL GROMMETS FOR ASSEMBLY TO VEHICLE

(71) Applicant: Ford Global Technologies, LLC, Dearborn, MI (US)

(72) Inventors: Jeff Boulton, Monroe, MI (US); David Lowrie, Windsor (CA); James Labadie, Dexter, MI (US); Preet Kamal Virk, Canton, MI (US); Roger Joseph Khami, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 220 days.

(21) Appl. No.: 16/135,528

(22) Filed: Sep. 19, 2018

(65) Prior Publication Data

US 2020/0086811 A1  Mar. 19, 2020

(51) Int. Cl.
*H01B 17/56* (2006.01)
*B60R 16/02* (2006.01)
*F16F 7/08* (2006.01)

(52) U.S. Cl.
CPC .......... *B60R 16/0222* (2013.01); *F16F 7/087* (2013.01)

(58) Field of Classification Search
CPC ............ B60R 16/0222; B60R 16/0215; B60R 16/0234; B60R 16/0239; B60R 16/027; B60R 19/24; B60R 19/30; F16F 7/087; F16F 7/00; F16F 7/09; F16F 9/00; F16F 9/003
USPC ......... 174/137 R, 138 R, 152 G, 153 G, 142; 248/635, 548, 638, 560, 674; 361/600, 361/601; 439/76.1, 76.2; 267/136, 137, 267/139, 140, 140.11, 140.12, 141, 141.2, 267/153, 141.3
See application file for complete search history.

(56) References Cited

U.S. PATENT DOCUMENTS 4,522,378 A * 6/1985 Nelson .................. F16B 5/0258
16/2.1
6,572,070 B2   6/2003 Arciero et al.
(Continued)

FOREIGN PATENT DOCUMENTS

JP  2009189210  8/2009
JP  2016138564  8/2016
(Continued)

*Primary Examiner* — Angel R Estrada

(57) ABSTRACT

A vibration damping assembly for use with an automotive vehicle is provided. The assembly includes a bracket having a C-shaped receptacle, a component such as an air cleaner housing having an integrally-formed, grommet-holding cylindrical post extending therefrom attached to the bracket, and a spool-shaped isolator mounting grommet attached to the post. The post includes a proximal end integrally attached to the component and a distal end. The distal end includes at least one integrally-formed retention barb and preferably includes two spaced-apart and integrally-formed barbs. The post includes an attachment end attached to the component and an unattached end opposite the attachment end. The barbs are formed on the unattached end. Each barb includes an upper edge extending beyond the unattached end of the post. Each barb includes a ramped, grommet-passing surface. The spool-shaped isolator mounting grommet may be formed from materials such as TPO, TPE, AEM, ECO, and EPDM.

20 Claims, 16 Drawing Sheets

(56) References Cited

U.S. PATENT DOCUMENTS

| | | | | |
|---|---|---|---|---|
| 7,208,853 | B2* | 4/2007 | Terrill | B60S 1/0447 |
| | | | | 248/638 |
| 7,510,163 | B2* | 3/2009 | Schlitzkus | B60T 8/3685 |
| | | | | 248/548 |
| 7,930,800 | B1* | 4/2011 | Castrale | F16L 5/10 |
| | | | | 16/2.2 |
| 8,123,308 | B2* | 2/2012 | Schlitzkus | B60T 8/3685 |
| | | | | 248/610 |
| 8,235,350 | B2* | 8/2012 | Tetsuda | F16F 1/3732 |
| | | | | 248/560 |
| 8,956,069 | B2* | 2/2015 | Kraft | F16D 55/00 |
| | | | | 403/168 |
| 2014/0367546 | A1 | 12/2014 | Hibi et al. | |

FOREIGN PATENT DOCUMENTS

| | | |
|---|---|---|
| KR | 100434981 | 6/2004 |
| WO | 2014072722 | 5/2014 |

\* cited by examiner

RUBBER SPOOL GROMMETS FOR ASSEMBLY TO VEHICLE

TECHNICAL FIELD

The disclosed inventive concept relates generally to insulating structures for use in mounting components to a vehicle. More particularly, the disclosed inventive concept relates to rubber spool grommets used in attaching a component, such as an air cleaner enclosure, to the body structure of an automotive vehicle. Each rubber spool grommet is attached to a post that is integrally molded with the air cleaner structure.

BACKGROUND OF THE INVENTION

Automobile designers are today challenged by a broad range of requirements externally imposed by customer demands at one extreme and by government regulation at the other. One such customer demand is for the reduction of overall vehicle noise, vibration and harshness (NVH). Known sources of vehicle noise in the internal combustion engine by are component-to-component support structures.

A specific example of such a component-to-component support structure is the engine air induction system filter enclosure or housing which is mounted to the engine, the powertrain, or the vehicle body structure. It is desired that the mounting features are exterior to the filter enclosure or housing so that a sub-assembly can be installed as a single closed unit. Typical mounting structures include tapered mounting pins and isolator grommets, metal compression-limiting sleeves and one or more threaded fasteners.

A traditional method of using rubber isolator grommets to mount an air cleaner housing to a vehicle is illustrated in FIGS. 1 and 2. An air cleaner housing is partially illustrated as 10. The air cleaner housing 10 includes a first attachment arm 11 and a second attachment arm 11'. Each of the first and second attachment arms 11 and 11' respectively includes a grommet-passing aperture of which one, a grommet-passing aperture 12, is illustrated in FIG. 2. A steel bracket 13 is used for attaching the air cleaner housing 10 to a portion of a vehicle, such as a hydro formed beam (not shown). The steel bracket 12 conventionally includes a first steel bracket arm 14, a second steel bracket arm 16, and a main attachment arm 18.

A pair of fastener assemblies 20 and 20' is provided for attaching the air cleaner housing 10 to the steel bracket 13. The fastener assembly 20 includes a thread cutting bolt 22 that forms a thread in the first steel bracket arm 14 upon insertion. The fastener assembly 20 further includes a metal compression limiter sleeve 24. The fastener assembly 20' includes a thread cutting bolt 22' that forms a thread in the second steel bracket arm 16 upon insertion. The fastener assembly 20' further includes a metal compression limiter sleeve 24'.

Donut-shaped rubber grommets are used to provide vibration-damping insulation between the air cleaner housing 10 and the steel bracket 13. A donut-shaped rubber grommet 26 is fitted into the aperture formed in the first attachment arm 11 and a rubber grommet 26' is fitted into the aperture formed in the second attachment arm 11'. The donut-shaped rubber grommets 26 and 26' are attached to the arms 11 and 11' respectively prior at attachment of the air cleaner housing 10 to the steel bracket 13.

On assembly, the metal compression limiter sleeve 24 is inserted into the donut-shaped grommet 26 and the metal compression limiter sleeve 24' is inserted into the donut-shaped grommet 26'. The air cleaner housing 10 having the donut-shaped rubber grommets 26 and 26' and the steel bracket 13 are positioned together such that the thread cutting bolt 22 may be inserted into and through the metal compression limiter sleeve 24 and the thread cutting bolt 22' may be inserted into and through the metal compression limiter sleeve 24'. Using an appropriate tool such as a power wrench, the installer then threads the thread cutting bolt 22 into the first steel bracket arm 14 and the thread cutting bolt 22' into the second steel bracket arm 16. The metal compression limiter sleeves 24 and 24' limit the depth to which the thread cutting bolts 22 and 22' respectively may be threaded. The torque of the installing tool, typically a direct current driver wrench, is controlled by the installer at the operations assembly plant.

While providing a generally useful approach to attaching a component such as an air filter housing to a vehicle, known attachment arrangements are labor intensive. In addition, known attachment arrangements frequently result in damaged threads and cross-threaded attachment bolts. Furthermore, access to the threaded fasteners is frequently limited due to limited under packaging space and tool access.

Accordingly, known approaches to providing practical and effective noise-limiting arrangements for attaching a component such as an air filter housing to an internal combustion engine bay have not provided completely satisfactory results. As in so many areas of vehicle technology, there is always room for improvement related to assembly noise reduction.

SUMMARY OF THE INVENTION

The disclosed inventive concept provides a practical and cost-effective solution to the challenge of providing a vibration damping and isolation arrangement for isolating a vehicle component, such as an air cleaner housing, to a vehicle. The disclosed inventive concept provides a vibration damping assembly for use with an automotive vehicle which includes a bracket having at least one C-shaped receptacle, a component such as an air cleaner housing having an integrally-formed, grommet-holding cylindrical post extending therefrom that is attached to the bracket, and a spool-shaped isolator mounting grommet attached to the post. The post, which may be of any of several shapes, including round, D-shaped, triangular, oval, or virtually any other polygonal shape, includes a proximal end integrally attached to the component and a distal end. The distal end includes a retention feature comprising at least one integrally-formed retention barb and preferably includes two spaced-apart and integrally-formed retention barbs. More than one retention barb may be provided or a single, disc-shaped washer may function as the barb.

The grommet-holding post includes an attachment end attached to the component and an unattached end opposite the attachment end. The retention barbs are positioned on the unattached end and may be integrally formed with the grommet-holding post or may be formed separately and attached by any of several methods, including mechanically by threading or chemically by an adhesive. Each barb includes an upper edge that extends beyond the unattached end of the post. Each barb preferably includes a ramped, grommet-passing surface. Regardless of the shape of the retention feature, its geometry is such that the elasticity of the spool-shaped isolator mounting grommet allows it to be stretched over the retention feature, a characteristic which coincidentally provides the required retention to the grommet-holding post over the life of the vehicle.

The spool-shaped isolator mounting grommet may be formed from any of several elastic materials, including, but not limited to TPO, TPE, AEM, ECO, and EPDM. The spool-shaped isolator mounting grommet includes a first end defined by a first radius, a second end defined by a second radius, and a tubular body formed therebetween. The spool-shaped isolator mounting grommet may be solid or may be split, the latter variation allowing easy placement of the grommet over the grommet-holding post. Regardless of the variation, the tubular body includes a post-passing bore. The tubular body is compressible. The tubular body has an uncompressed diameter and a compressed diameter. The uncompressed diameter is greater than the compressed diameter. The C-shaped receptacle has an inner diameter which is smaller than the uncompressed diameter of the body.

As a further variation, the spool-shaped isolator mounting grommet may be substituted for by an over-molded elastomeric coating formed over the C-shaped receptacle of the bracket. This variation eliminates the need to for the spool-shaped isolator mounting grommet to be fitted to the grommet-holding post.

The vibration damping assembly of the disclosed inventive concept provides an effective and efficient response to the need to reduce vibration and consequential noise in the automotive vehicle. The vibration damping assembly disclosed herein is relatively inexpensive to produce, provides for easy installation of the component such as an air cleaner without the need for tools, and also provides for easy removal of the component, again without the need for tools.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
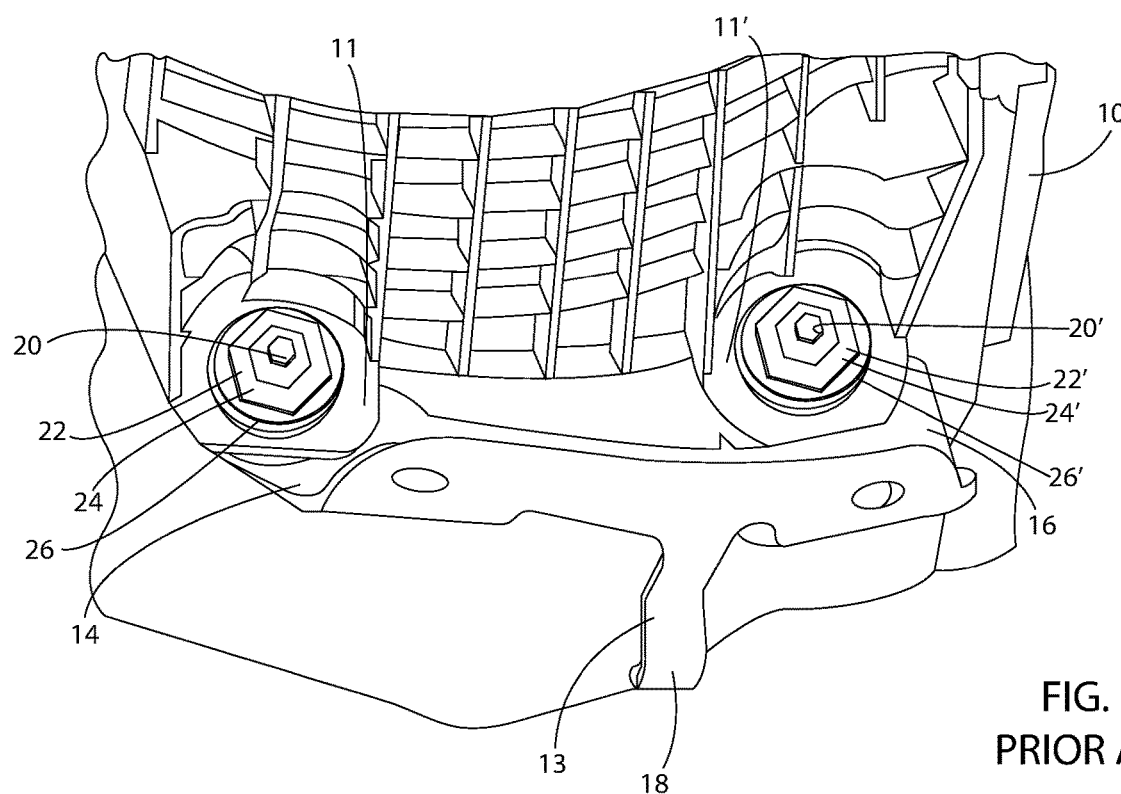
FIG. 1 is a perspective view of an air cleaner housing and steel bracket arrangement using known attachment assemblies that incorporate donut-shaped isolator grommets.
Figure 2:
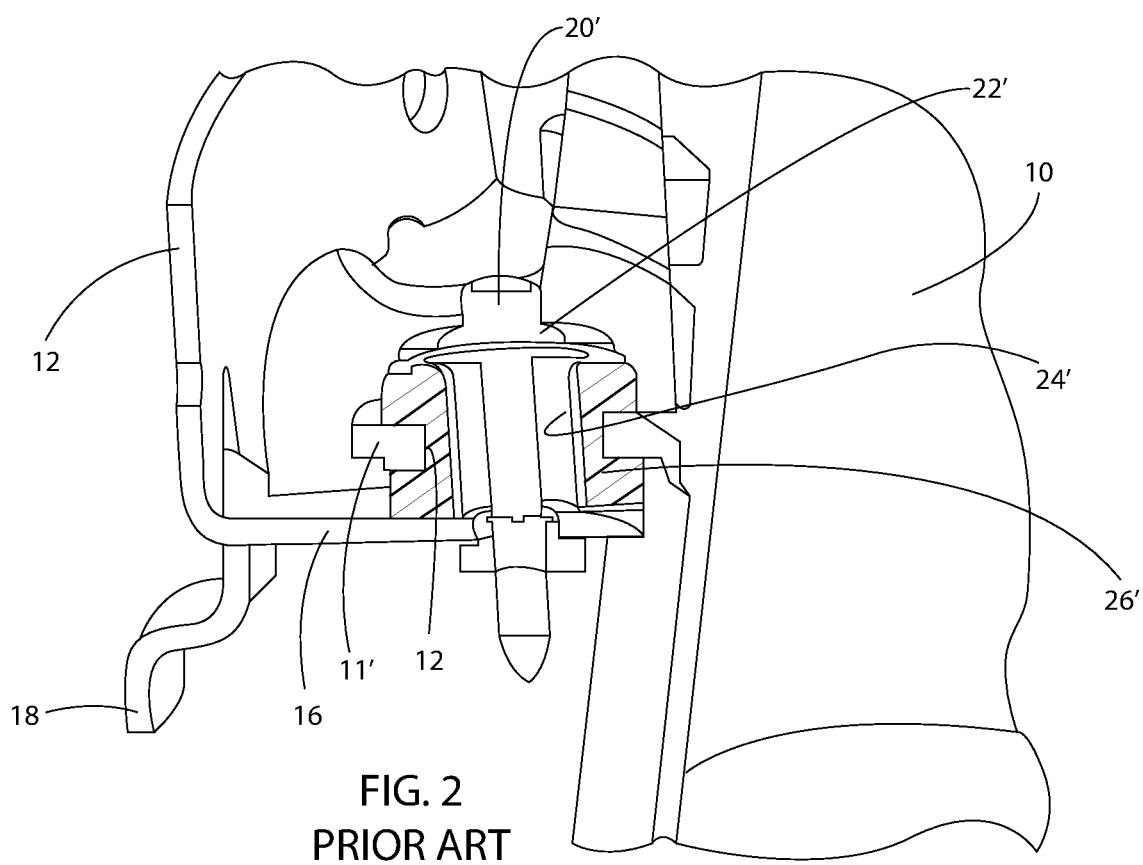
FIG. 2 is a partial sectional view of an attachment assembly, the air cleaner housing, and the steel bracket of the known arrangement illustrated in FIG. 1.

In the following figures, the same reference numerals will be used to refer to the same components. In the following description, various operating parameters and components are described for different constructed embodiments. These specific parameters and components are included as examples and are not meant to be limiting.

The accompanying figures and the associated description illustrate a vibration-damping insulating system for attaching a component requiring isolation from vehicle vibration, such as an air cleaner housing, to a substrate having inherent vibration, such as a vehicle engine compartment. In particular, FIGS. 3 through 9 illustrate one or more components of the preferred embodiment of an arrangement utilizing rubber grommets having a preferred although not exclusive "spool" shape for attachment to side mounted posts that are integrally formed with an air cleaner housing according to the disclosed inventive concept. The side mounted posts may be of any of several shapes, including round, D-shaped, triangular, oval, or virtually any other polygonal shape. Preferably, the side mounted posts are integrally formed with the component, although it is possible that the posts are formed separately and are attached to the component by any of several methods including adhesives, welding, threaded fastening, or twist locking. Retaining barbs are also integrally formed with the posts to hold the grommets in place on the post. A component-receiving bracket fixed to a surface of the vehicle's engine compartment or drive train includes at least one but preferably at least two C-shaped receptacles that receive and hold the rubber grommets fitted to the side mounting posts. According to this arrangement, the spool-shaped grommets dampen vibration that would otherwise pass from moving parts of the vehicle to the component that is attached to the vehicle. The spool grommet is designed to provide improved assembly tolerance compliance as well as improved vibration isolation when compared with known fastening arrangements. By using the grommet, post and bracket arrangement of the disclosed inventive concept, positive mounting location occurs along the vehicle's x-axis, y-axis, and z-axis.

When in its unattached and uncompressed state, the outer diameter of the rubber grommet is slightly larger than the width of the C-shaped receptacle. The thickness of the rubber grommet, together with its hardness and material volume, are calculated to compress through the narrow opening of the C-shaped receptacle. Once the grommet is pushed past the narrow opening defined by the C-shaped receptacle, the entire relaxed diameter of the grommet rests comfortably in the home position in the bracket.

It is to be understood that the illustrated air cleaner housing and support bracket are only suggestive and are not intended as being limiting as the attachment arrangement using the rubber spool grommet may be adapted for use with any component requiring insulation from vibration when attached to an automotive vehicle.

In general, the vibration-damping insulating system according to the disclosed inventive concept provides superior short and long term performance over the known technologies. The vibration-damping insulating system pertains to any mounting arrangement in which arrangements incorporating rubber isolator grommets, metal compression limiting sleeves, and threaded fasteners were traditionally used. According to the disclosed inventive concept, these three components are replaced by the single elastomeric spool-shaped grommet. In addition to eliminating these three individual components, the need for tools for assembly, such as open-ended wrenches or socket wrenches have been eliminated as the system may be attached by hand. In addition, the system according to the disclosed inventive concept overcomes the challenges faced by installers given known space limitations in which hand tools are frequently difficult to use and tool access is either limited or entirely non-existent. Instead, by eliminating the need for hand tools, the installer merely pushes the component to be attached into place. To install the air cleaner box or other component, the installer typically (but not necessarily) pushes the component downward for attachment to the bracket, although the insulating system of the disclosed inventive concept may be used to attach a component to a vehicle in virtually any direction. Similarly, removal of the component from the bracket may also be readily accomplished without the need for hand tools. The disclosed system further eliminates the need for additional fasteners, such as mechanical fasteners, or any other means of attachment, such as adhesives or welding.

In general, the vibration-damping insulating system disclosed herein may find application on vehicles of different sizes and performance ratings. For example, the disclosed system may find use on heavy-duty vehicles given the additional load-bearing area of the rubber isolator grommet when compared with known arrangements. The increased load-bearing area provides improved bracket retention support and durability. Furthermore, the vibration-damping insulating system of the disclosed inventive concept allows the installation of larger components compared with the sizes of components attached by traditional methods. In the case of the component being an air filter, because no access is needed for hand tools and because of the simplified method of attachment, larger air filters may be fitted in spaces that at one time only allowed smaller air filters. The increased filter size has several advantages, including lower air flow restriction (thus resulting in increased engine power, larger particulate filtering capacity, increased filtration efficiency, and increased acoustic volume, a feature important for noise cancellation.

Figure 14:
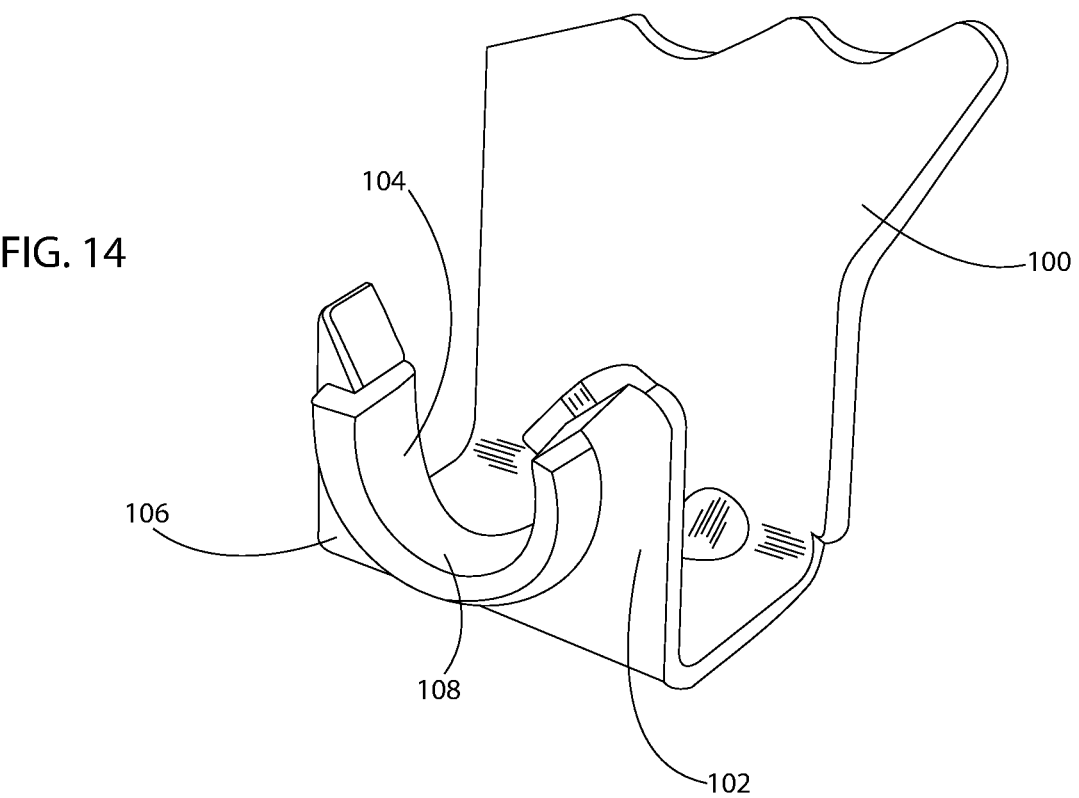
FIG. 14 is perspective view of an alternative variation of a bracket having an over-molded C-shaped receptacle.
Figure 15:
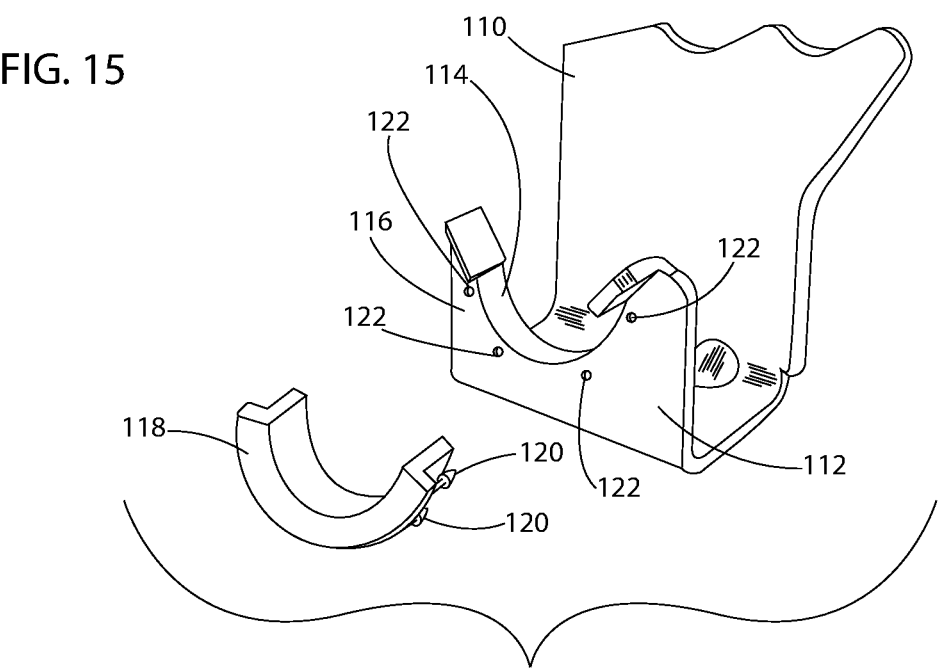
FIG. 15 is perspective view of an additional alternative variation of a bracket having a separately molded, C-shaped elastomeric liner spaced apart from the bracket.
Figure 16:
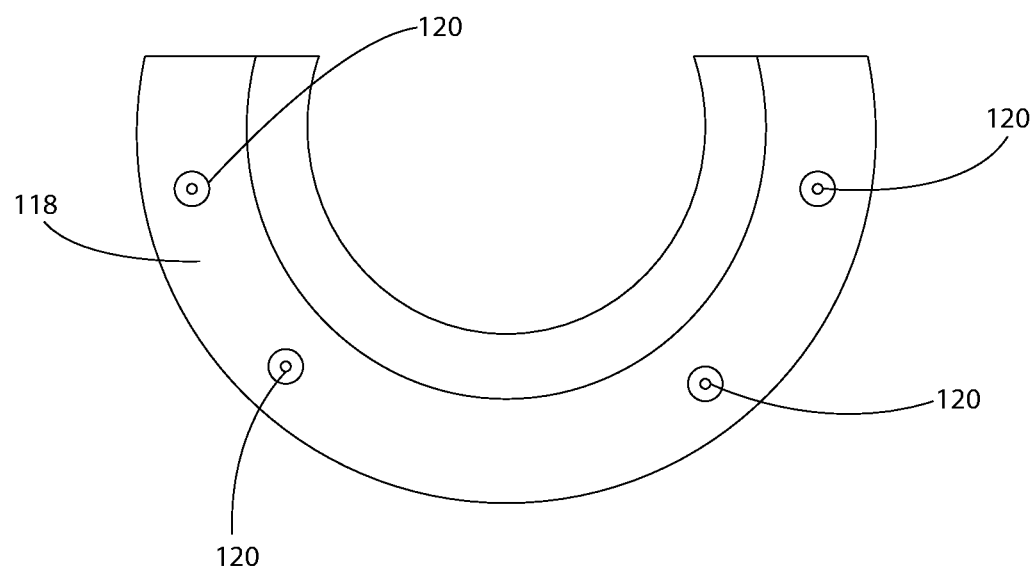
FIG. 16 is a view of the attachment side of the C-shaped elastomeric liner of the bracket variation of FIG. 15.

The disclosed inventive concept is illustrated and described in four non-limiting variations. The first variation is illustrated in FIGS. 3 through 9. The second variation is illustrated in FIGS. 10 through 13. The third variation is illustrated in FIG. 14. The fourth variation is illustrated in FIGS. 15 and 16.

Figure 3:
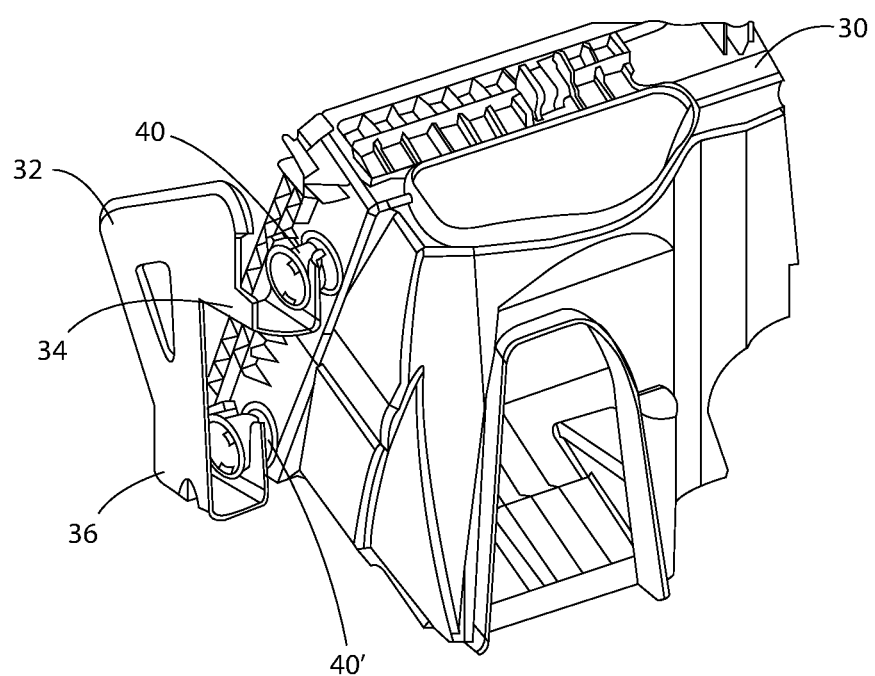
FIG. 3 is a perspective view of a portion of an air cleaner housing and steel bracket arrangement incorporating a rubber isolator grommet attachment arrangement according to the disclosed inventive concept.

Referring to the first variation and particularly to FIG. 3, a perspective view of a portion of an air cleaner housing and steel bracket arrangement incorporating a rubber isolator grommet attachment arrangement according to the disclosed inventive concept is illustrated. The illustrated portion of an air cleaner housing is a lower air cleaner housing 30 of an air cleaner housing. The lower air cleaner housing 30 of the air cleaner housing may be of any of several shapes adapted for use in any one of several arrangements in relation to any of several internal combustion engines. However, regardless of the application, the ambient air enters the air cleaner housing, passes through a filtering material, and exits the air cleaner housing. A support bracket such as a support bracket 32 is provided for attachment of the lower air cleaner housing 30 to a fixed structure on the automotive vehicle, such as on the right hand side of a hydro formed beam (not illustrated).

The support bracket 32 may be made from any of a variety of materials including, without limitation, steel, aluminum, or a rigid plastic. It is to be understood that the support bracket 32 may be of any of a variety of shapes and, thus, the illustrated shape is intended as being suggestive but not limiting. With the broad flexibility of the disclosed inventive concept in mind, the support bracket 32 preferably but not exclusively includes an upper steel bracket arm 34 and a lower steel bracket arm 36. A greater or lesser number of bracket arms may be provided on the support bracket 32.

An important feature of the disclosed inventive concept is its easy installation that requires minimum effort on the part of the installer without using any tools as the lower air cleaner housing 30 may be simply locked onto the support bracket 32 by a simple unidirectional motion. This assembly feature is made possible by the support bracket 32 being first fixedly attached to the automotive vehicle in a desired place (not shown).

The lower air cleaner housing 30 includes an upper grommet assembly 40 and a lower grommet assembly 40'. While it is possible that a single grommet assembly may be used in conjunction with, for example, a peg and slot arrangement for guiding the attachment of the lower air cleaner housing 30 with a support bracket, it is preferable that at least two grommet assemblies be adapted for use. Thus use of the paired grommet assemblies 40 and 40' is preferred but is not intended as being limiting as, for example, three grommet assemblies may be used. The rubber spool grommet and the C-shaped receptacle may be used in combination with conventional mounting features such as tapered mounting pegs and donut-shaped channel grommets having a threaded fastener arrangement (neither shown).

Figure 4:
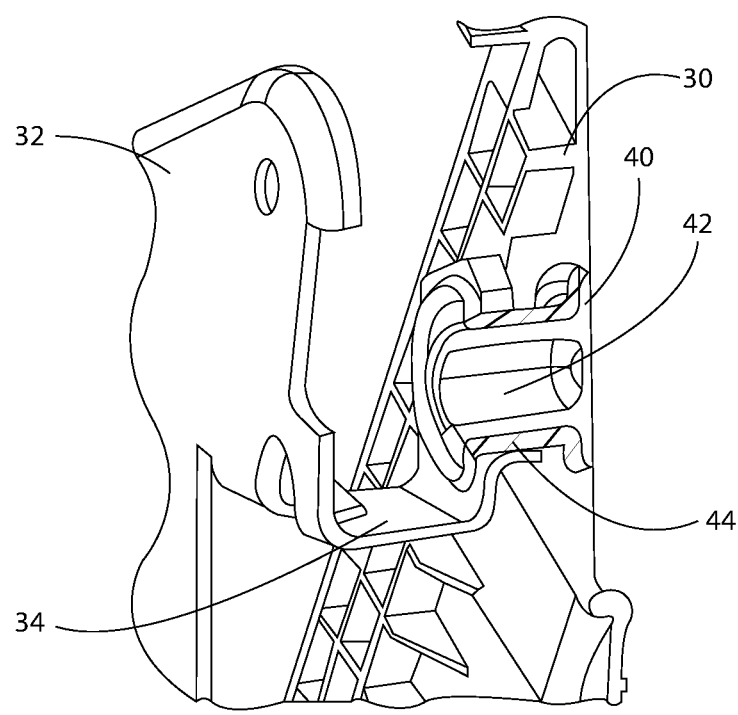
FIG. 4 is partial sectional view illustrating the steel mounting bracket attached to a spool-shaped rubber isolator grommet mounted on a post integrally formed with the air cleaner housing according to the disclosed inventive concept.

Referring to FIG. 4, a partial sectional view illustrating a portion of the support bracket 32 to which the upper grommet assembly 40 is attached, also shown in sectional view. A side mounted cylindrical post 42 extends from the lower housing 30 and is integrally molded therewith. By integrally molding the side mounted cylindrical post 42 with the lower air cleaner housing 30, a number of advantages are achieved. One such advantage is increased structural integrity. Another advantage is more efficient production by, for example, providing a single mold for simultaneous production of the lower housing 30 together with the side mounted cylindrical post 42.

An elastomeric, spool-shaped isolator mounting grommet 44 is fitted over and onto the side mounted cylindrical post 42. The spool-shaped isolator mounting grommet 44 may be formed from a variety of elastomeric materials including, without limitation, TPO, TPE, AEM, ECO, or EPDM. Because of its elastic nature, the spool-shaped isolator mounting grommet 44 may be stretched for fitting over the side mounted cylindrical post 42 and, once fitted, returns to its original shape, tightly hugging the side mounted cylindrical post 42.

Figure 5:
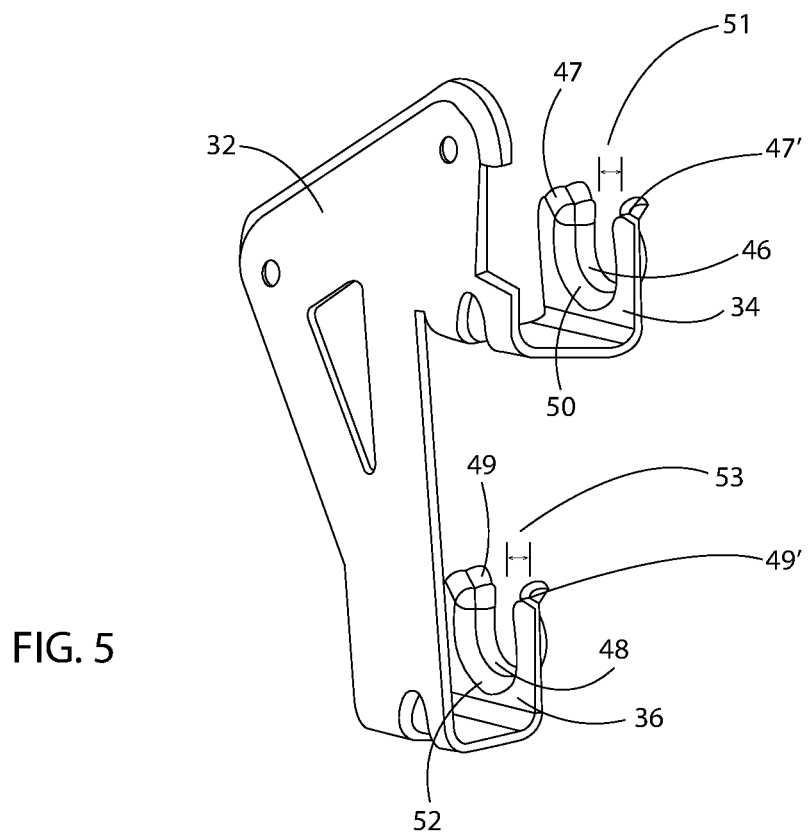
FIG. 5 is a perspective view of the bracket used in conjunction with the attachment arrangement of the disclosed inventive concept.

The support bracket 32 is illustrated in perspective view in FIG. 5. It is to be understood that the configuration and size of the support bracket 32 illustrated in FIG. 5 is suggestive only and is not intended as being limiting. The support bracket 32 is attached to a fixed structure in the vehicle's engine bay, such as the right hand side of a hydro formed beam (not shown). The support bracket 32 can alternatively be attached to the engine or other power source as well as to related components. The support bracket 32 includes a first C-shaped receptacle in the form of an upper bracket arm grommet slot 46 and a second C-shaped receptacle in the form of a lower bracket arm grommet slot 48. The upper bracket arm grommet slot 46 is defined by two opposed grommet slot arms 47 and 47' and the lower bracket arm grommet slot 48 is defined by two opposed grommet slot arms 49 and 49'. The upper bracket grommet slot 46 includes a formed radius 50 for stamping robustness and assembly lead-in. The formed radius 50 also keeps the spool-shaped grommet from being cut. The straits opening 51 is formed between the two opposed grommet slot arms 47 and 47' and is generally perpendicular to the long axes of the two opposed grommet slot arms 47 and 47'. In addition, a straits opening 51 is defined in the upper bracket arm grommet slot 46 for spool retention. The lower bracket grommet slot 48 includes a formed radius 52 for stamping robustness and assembly lead-in. The formed radius 52 also keeps the spool-shaped grommet from being cut. In addition, a straits opening 53 is defined in the upper bracket arm grommet slot 46 for spool retention. The straits opening 53 is formed between the two opposed grommet slot arms 49 and 49' and is generally perpendicular to the long axes of the two opposed grommet slot arms 49 and 49'.

Figure 6:
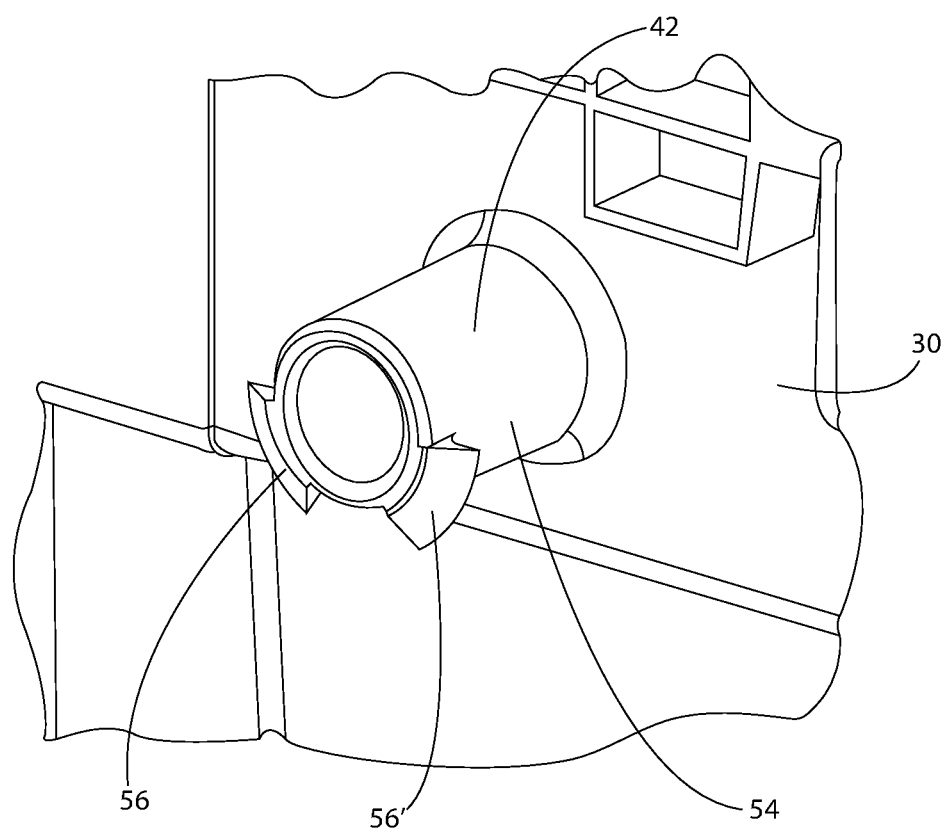
FIG. 6 is a perspective view of a portion of an air cleaner housing having an attachment post integrally formed thereon according to the disclosed inventive concept.

FIG. 6 illustrates a perspective view of a portion of the lower air cleaner housing 30 having the integrated side mounted cylindrical post 42 extending therefrom. To maintain the mounting grommet on the cylindrical post without the need for an adhesive, a system of integrally molded retention barbs is provided. As illustrated, a pair of spaced-apart integrally molded retention barbs 56 and 56' is provided on the distal end of the side mounted cylindrical post 42 which is itself attached at its proximal end to the lower air cleaner housing 30. It is to be understood that the illustrated number, size and placement of the retention barbs 56 and 56' is suggestive and is not intended as being limiting. The spaced apart integrally molded retention barbs 56 and 56' hold the mounting grommet in place during shipment between the component production plan and the vehicle operations plants. In addition, the spaced apart integrally mounted retention barbs 56 and 56' hold the mounting grommet and the component in place during engine roll and vehicle operation. The geometry of the retention features is designed to provide positive retention of the mounting grommet over the life of the vehicle, while providing the compliance necessary to allow the mounting grommet to be stretched into position for attachment to the mounting post. The retention feature can be manufactured as a separate component and thereafter snapped, threaded, welded, and twist locked to the end of the mounting post. The mounting grommet can, alternatively, be an insert or over-molded to the mounting post.

As illustrated in FIG. 6, each of the spaced-apart integrally molded retention barbs 56 and 56' preferably but not necessarily includes a ramped upper end that allows for easier installation of the mounting grommet onto the cylindrical post. The leading edge of each ramped upper end extends beyond the upper end of the side mounted cylindrical post 42 as illustrated.

Figure 7:
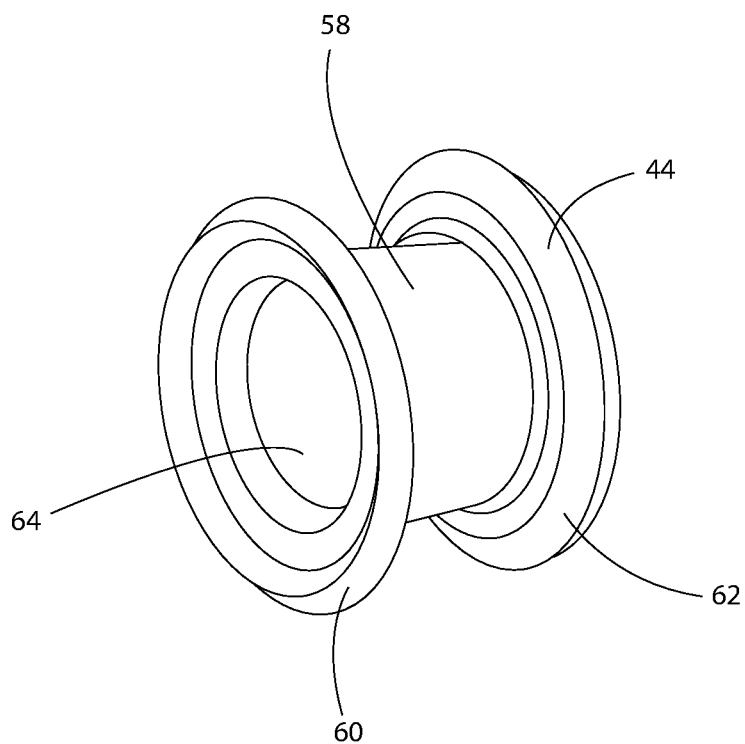
FIG. 7 is a perspective view of the rubber spool grommet for use with the attachment arrangement of the disclosed inventive concept.

The elastomeric, spool-shaped isolator mounting grommet 44 is illustrated in an isolated perspective view in FIG. 7. With reference thereto, the spool-shaped isolator mounting grommet 44 includes a tubular body 58 having a first end defining a first radius 60 and a second end defining a second radius 62. A post-passing bore 64 is formed through the tubular body 58 between the first radius 60 and the second radius 62.

Figure 8:
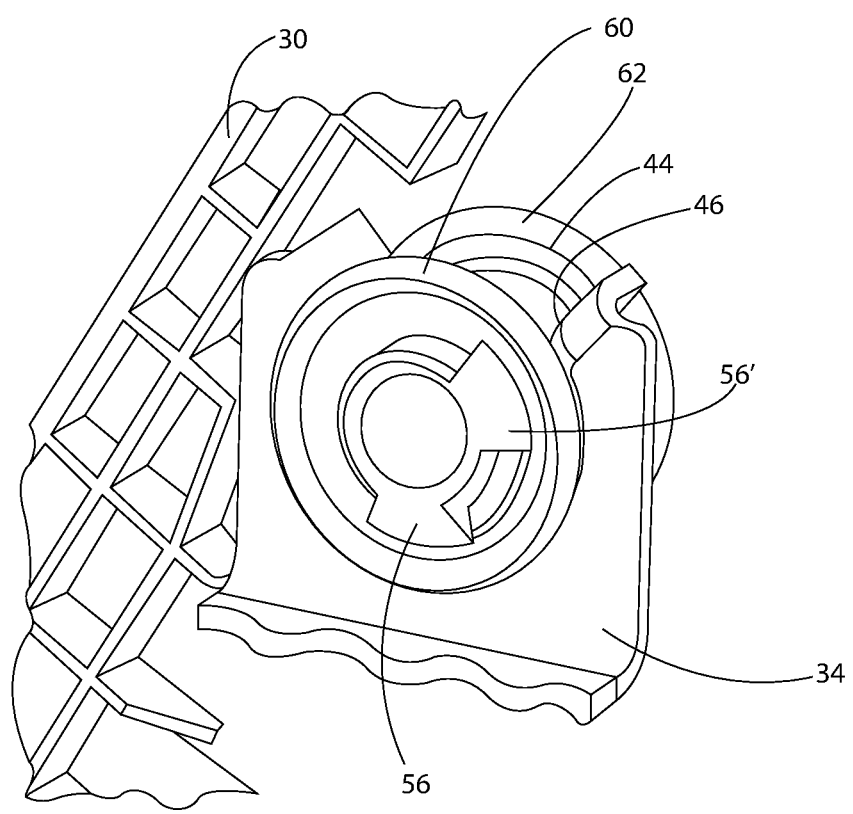
FIG. 8 is an end view of a rubber spool grommet fitted to an attachment post and having the metal bracket attached thereto according to the disclosed inventive concept.

An end view of the spool-shaped isolator mounting grommet 44 shown in position on the side mounted cylindrical post 42 and captured by the upper bracket arm grommet slot 46 is illustrated in FIG. 8. With reference thereto, the spaced apart integrally molded retention barbs 56 and 56' are illustrated as being positioned against the first radius 60, thereby retaining the spool-shaped isolator mounting grommet 44 on the side mounted cylindrical post 42.

Figure 9:
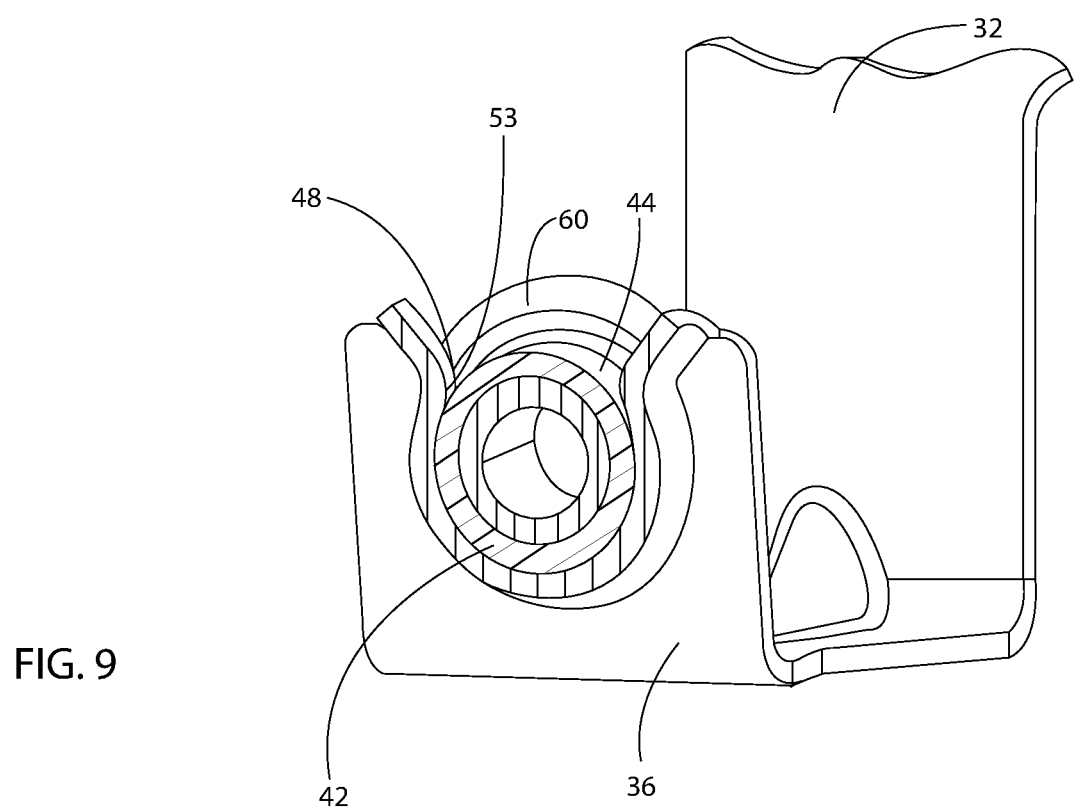
FIG. 9 is view similar to that of FIG. 8 but showing the attachment assembly viewed from the opposite end in which the post and the rubber spool grommet are shown in sectional view.

FIG. 9 is a view similar to that of FIG. 8 but illustrates the assembly from the opposite end in which the side mounted cylindrical post 42 and the spool-shaped isolator mounting grommet 44 are shown in sectional view. According to this view, the spool-shaped isolator mounting bracket 44 may be seen as being securely captured against unforced release by placement in the lower bracket grommet slot 48.

Figure 10:
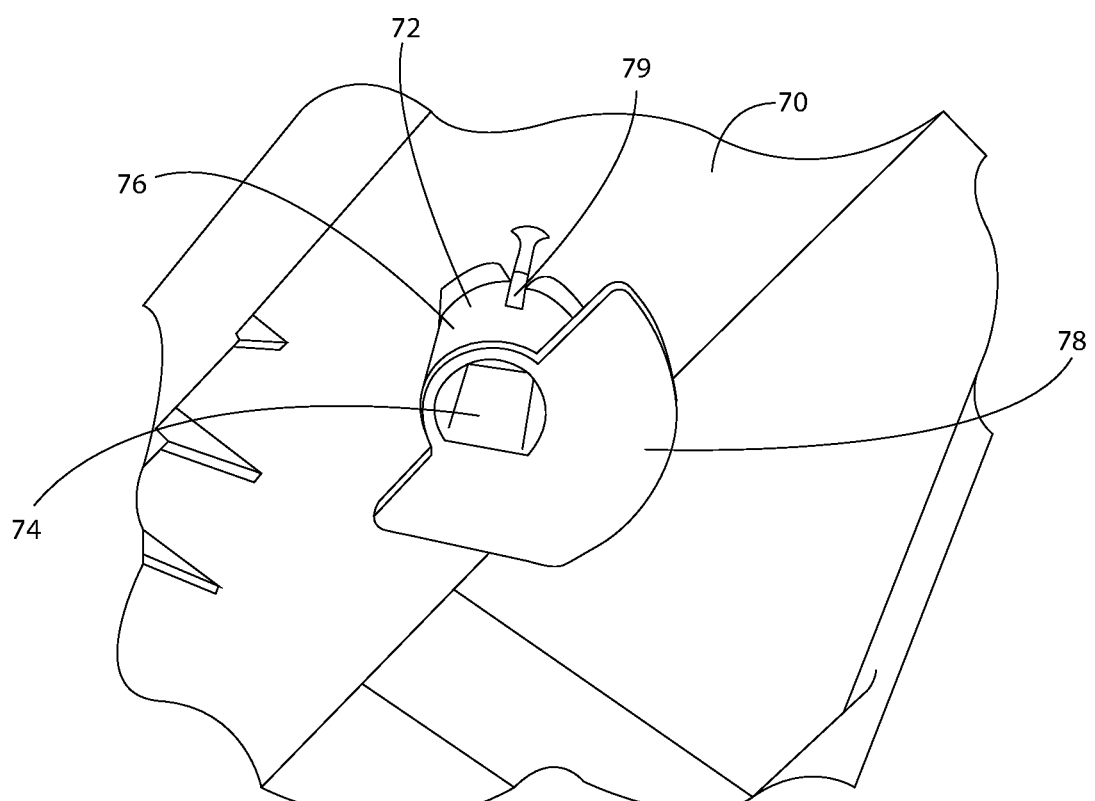
FIG. 10 is a perspective view of a portion of an air cleaner housing having an attachment post integrally formed thereon according to an alternative variation of the disclosed inventive concept.

Referring to the second variation of the disclosed inventive embodiment and in particular to FIG. 10, a perspective view of a portion of a lower air cleaner housing 70 having the integrated side mounted post 72 extending therefrom is illustrated. The integrated side mounted post 72 may be of any of several shapes, but preferably although not exclusively has a D-shaped configuration in which a flat base 74 is formed as part of a cylindrical body 76. A grommet locator ridge 79 is optionally but preferably formed between the lower air cleaner housing 70 and the cylindrical body 76.

To maintain the mounting grommet on the cylindrical post without the need for an adhesive, a partially disc-shaped retainer 78 is provided. The partially disc-shaped retainer 78 may be integrally molded with the integrated side mounted post 72 or may be formed separately and attached to the integrated side mounted post 72 mechanically, such as by fastening, or chemically, such as by an adhesive. The partially disc-shaped retainer 78 functions in the same manner as the pair of spaced-apart integrally molded retention barbs 56 and 56' discussed above and illustrated relative to the first variation of the disclosed inventive concept. The partially disc-shaped retainer 78 is provided on the distal end of the integrated side mounted post 72 which is itself attached at its proximal end to the lower air cleaner housing 70. It is to be understood that the illustrated shape and size of the partially disc-shaped retainer 78 is suggestive and is not intended as being limiting. Like the spaced apart integrally molded retention barbs 56 and 56' discussed above, the partially disc-shaped retainer 78 holds the mounting grommet in place during shipment between the component production plan and the vehicle operations plants. In addition, the partially disc-shaped retainer 78 holds the mounting grommet and the component in place during engine roll and vehicle operation.

Figure 11:
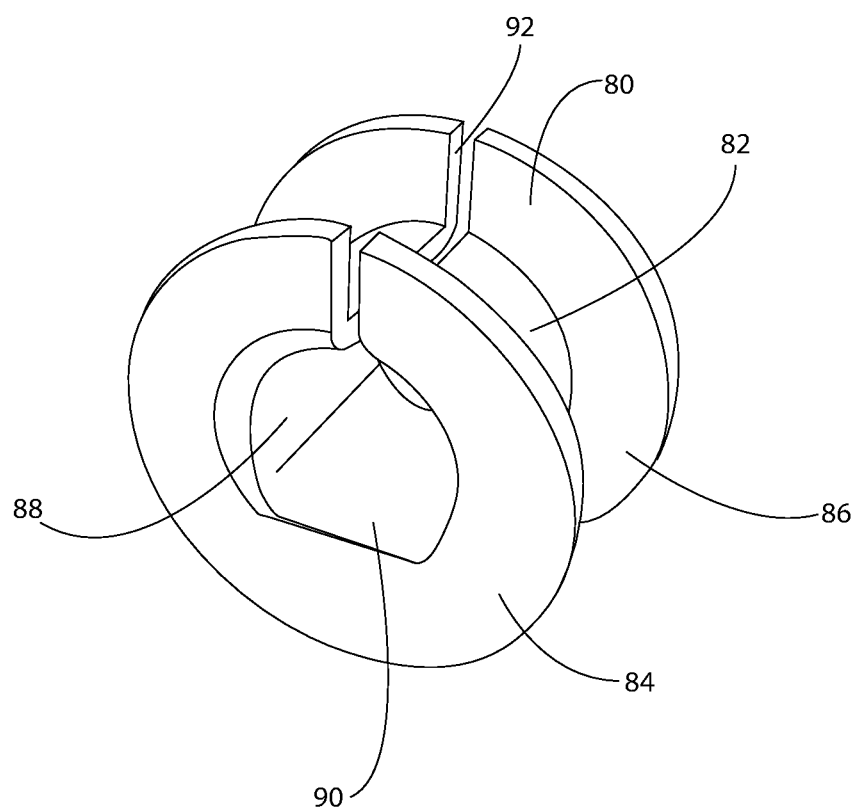
FIG. 11 is a perspective view of the rubber spool grommet for use with the attachment arrangement of the variation of the attachment post illustrated in FIG. 10.

An elastomeric, spool-shaped isolator mounting grommet 80 for use with the second variation of the disclosed inventive embodiment is illustrated in perspective view in FIG. 11. With respect to that figure, the spool-shaped isolator mounting grommet 80 includes a generally tubular body 82 having a first end defining a first radius 84 and a second end defining a second radius 86. A post-passing bore 88 is formed through the tubular body 82 between the first radius 84 and the second radius 82. A flat base 90 is preferably although not absolutely formed in the tubular body 82. The flat base 90 of the elastomeric, spool-shaped isolator mounting grommet 80 cooperates with the flat base 74 of the cylindrical body 76 of the integrated side mounted post 72. A slot 92 is formed in the tubular body 82. Because of the elastic nature of the spool-shaped isolator mounting grommet 80, the slot 92 allows the installer to readily fit the spool-shaped isolator mounting grommet 80 to the integrated side mounted post 72. Once attached, the slot 92 is aligned with the grommet locator ridge 79 as illustrated in FIGS. 12 and 13.

Figure 12:
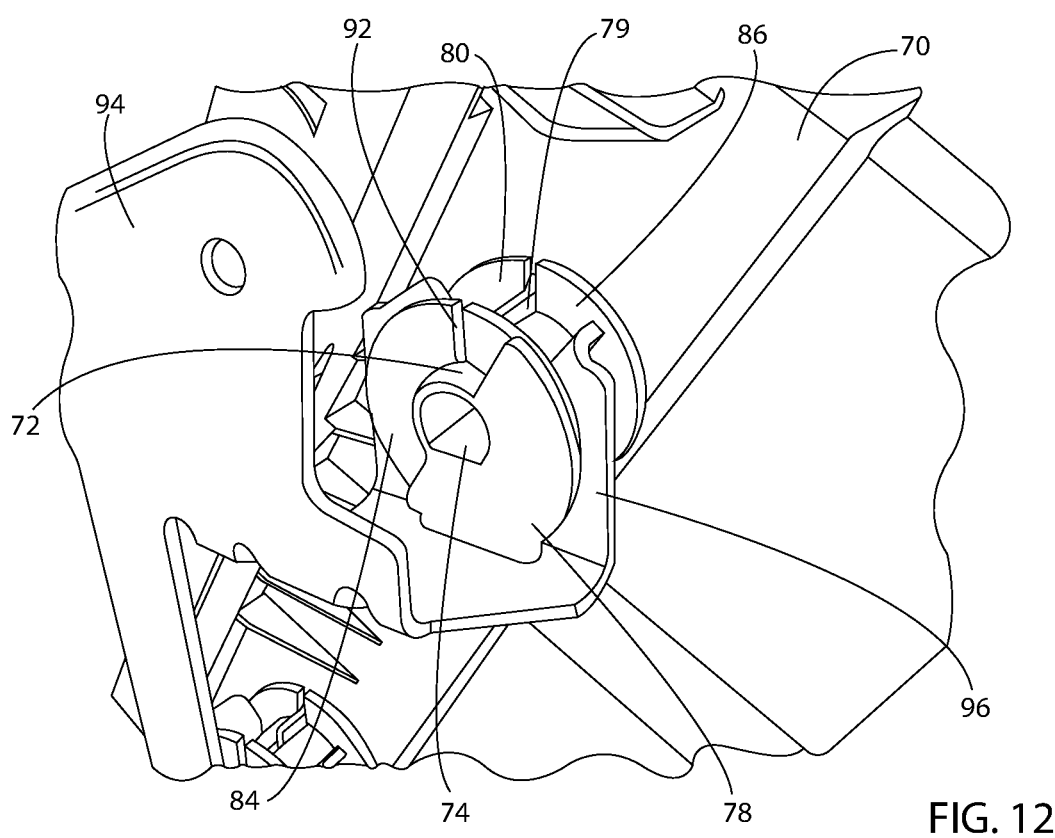
FIG. 12 is an end view of the rubber spool grommet of FIG. 11 fitted to the attachment post of FIG. 10 and having the metal bracket attached thereto according to the alternative variation of the disclosed inventive concept.
Figure 13:
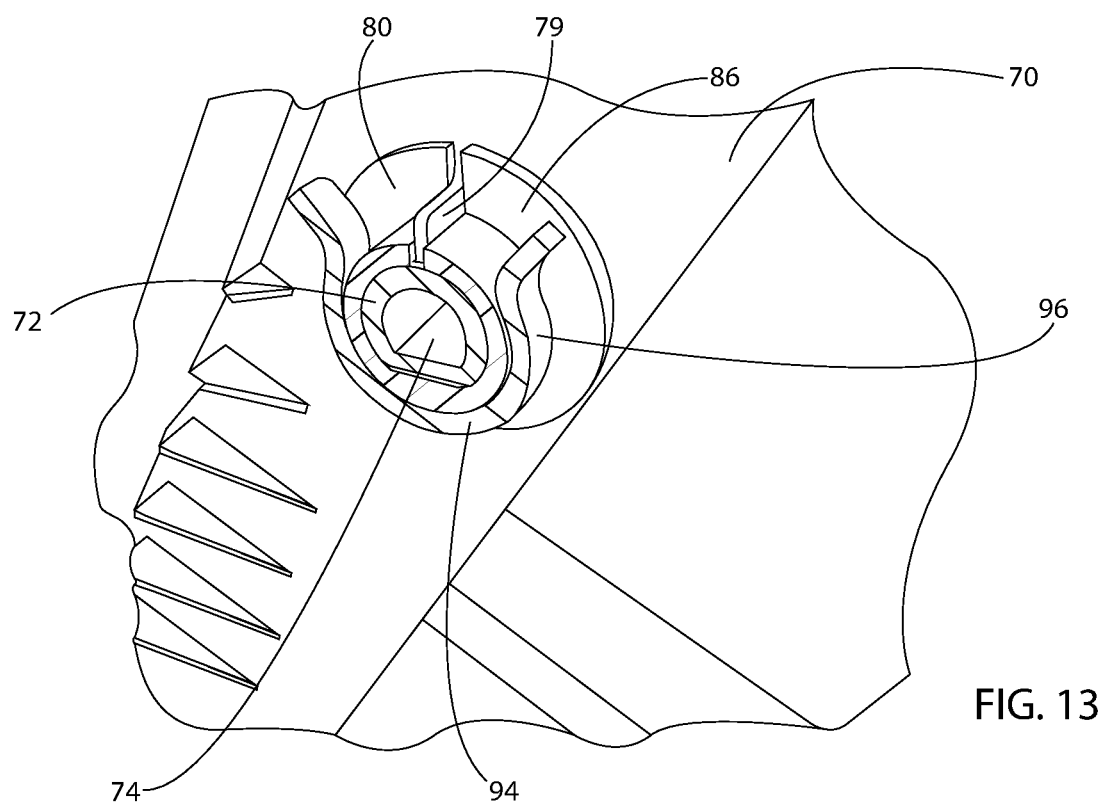
FIG. 13 is view similar to that of FIG. 12 but showing the attachment assembly in which the post and the rubber spool grommet are shown in sectional view.

With reference to FIGS. 12 and 13, the elastomeric, spool-shaped isolator mounting grommet 80 is illustrated in position on the integrated side mounted post 72. The elastomeric, spool-shaped isolator mounting grommet 80 is fitted to the integrated side mounted post 72 such that the grommet locator ridge 79 is positioned generally within the slot 92, thereby assuring proper alignment of the components to one another.

The lower air cleaner housing 70 is removably attachable to a support bracket 94. Like the support bracket 32 illustrated in particular in FIG. 5 and discussed in conjunction therewith, the support bracket 94 is attached to a fixed structure in the vehicle's engine bay, such as the right hand side of a hydro formed beam (not shown). The support bracket 94 includes at least one C-shaped receptacle in the form of a bracket arm grommet slot 96. FIG. 13 illustrates the elastomeric, spool-shaped isolator mounting grommet 80, the integrated side mounted post 72, and the bracket arm grommet slot 96 in sectional view. This figure also illustrates the cooperative structural relationship between each of these components.

While the first variation of the disclosed inventive concept is illustrated in FIGS. 3 through 9 and the second variation is illustrated in FIGS. 10 through 13, a third variation of the disclosed inventive concept is illustrated in FIG. 14 and a fourth variation of the disclosed inventive concept is illustrated in FIGS. 15 and 16. The first and second variations of the disclosed inventive concept are directed to a spool-shaped isolator mounting grommet fitted over an integrated side mounted post. As a variation of that basic concept, and as illustrated in FIG. 14, the function of the isolator mounting grommet may be incorporated into the bracket itself. As a further variation of the disclosed inventive concept, the isolator mounting grommet may be formed separately and attached to the bracket as illustrated in FIGS. 15 and 16.

With reference to the third variation of the disclosed inventive concept illustrated in FIG. 14, a support bracket 100 is illustrated in perspective view. Like the support brackets 32 and 94 discussed above and illustrated in the accompanying figures, the support bracket 100 is attached to a fixed structure in the vehicle's engine bay, such as the right hand side of a hydro formed beam (not shown). The bracket 100 includes a post attachment portion 102 having a C-shaped receptacle 104. The C-shaped receptacle 104 is formed in an attachment wall 106 of the post attachment portion 102.

The C-shaped receptacle 104 is overcoated with an elastomeric material 108. The elastomeric material 108 may be formed from a variety of elastomeric materials including, without limitation, TPO, TPE, AEM, ECO, or EPDM. The overcoated elastomeric material 108 eliminates the need for an elastomeric grommet as the C-shaped receptacle 104 may be attached directly to the integrated side mounted post without the need for a separate elastomeric grommet.

With reference to the fourth variation of the disclosed inventive concept illustrated in FIG. 15, a support bracket 110 is illustrated in perspective view. Like the support brackets 32, 94, and 100 discussed above and illustrated in the accompanying figures, the support bracket 110 is attached to a fixed structure in the vehicle's engine bay, such as the right hand side of a hydro formed beam (not shown). The support bracket 110 includes a post attachment portion 112 having a C-shaped receptacle 114. The C-shaped receptacle 114 is formed in an attachment wall 116 of the post attachment portion 112.

A C-shaped elastomeric liner 118 is separately formed for attachment to attachment wall 116. The C-shaped elastomeric liner 118 may be formed from a variety of elastomeric materials including, without limitation, TPO, TPE, AEM, ECO, or EPDM. The attachment side of the C-shaped elastomeric liner 118 is illustrated in FIG. 16. The attachment side of the C-shaped elastomeric liner 118 includes attachment pins 120 that are attachable to a like number of attachment pin receivers 122. A greater or lesser number of attachment pins 120 and attachment pin receivers 122 may be provided as needed for secure attachment of the C-shaped elastomeric liner 118 to the support bracket 110.

One skilled in the art will readily recognize from the above discussion, and from the accompanying drawings and claims, that various changes, modifications and variations can be made therein without departing from the true spirit and fair scope of the invention as defined by the following claims.

What is claimed is:

1. A vibration damping assembly for use with an automotive vehicle comprising:
   a bracket having a C-shaped receptacle;
   a component attachable to said bracket, said component including an integrally-formed post, said post including an end having a grommet retention barb integrally formed therewith, and
   a spool-shaped isolator mounting grommet attached to said post, wherein the post is a unitary solid structure that extends completely through the spool-shaped isolator mounting grommet.

2. The vibration damping assembly of claim 1, wherein said a spool-shaped isolator mounting grommet is formed from an elastomeric material.

3. The vibration damping assembly of claim 2, wherein said elastomeric material is selected from the group consisting of TPO, TPE, AEM, ECO, and EPDM.

4. The vibration damping assembly of claim 1, wherein said spool-shaped isolator mounting grommet includes a first end defined by a first radius, a second end defined by a second radius, and a tubular body formed therebetween, said tubular body including a post-passing bore.

5. The vibration damping assembly of claim 1, wherein said post includes an attachment end attached to said component and an unattached end opposite said attachment end, said retention barb is formed on said unattached end.

6. The vibration damping assembly of claim 5, wherein said barb includes an upper edge that extends beyond said unattached end of said post.

7. The vibration damping assembly of claim 5, wherein said barb includes a ramped, grommet-passing surface.

8. The vibration damping assembly of claim 1, wherein said post has a shape, said shape being selected from the group consisting of round, triangular, oval, and D-shaped.

9. The vibration damping assembly of claim 1, wherein said spool-shaped isolator mounting grommet includes a body, said body being compressible, said body having an uncompressed diameter and a compressed diameter, said uncompressed diameter being greater than said compressed diameter, said C-shaped receptacle has an inner diameter, said uncompressed diameter of said body being greater than said inner diameter of said C-shaped receptacle.

10. The vibration damping assembly of claim 1, wherein said spool-shaped isolator mounting grommet component includes a long axis and a slot formed along said long axis and wherein said integrally-formed post includes a grommet locator ridge, whereby said grommet locator ridge is positioned within said slot of said spool-shaped isolator mounting grommet.

11. A vibration damping assembly for use with an automotive vehicle comprising:
    a bracket having a C-shaped receptacle;
    a component attachable to said bracket, said component including an integrally-formed post, said post further including an end having a grommet retention barb integrally formed therewith, said barb including a ramped, grommet-passing surface, and
    a spool-shaped isolator mounting grommet attached to said post, wherein the post is a unitary solid structure that extends completely through the spool-shaped isolator mounting grommet.

12. The vibration damping assembly of claim 11, wherein said a spool-shaped isolator mounting grommet is formed from an elastomeric material.

13. The vibration damping assembly of claim 12, wherein said elastomeric material is selected from the group consisting of TPO, TPE, AEM, ECO, and EPDM.

14. The vibration damping assembly of claim 11, wherein said spool-shaped isolator mounting grommet includes a first end defined by a first radius, a second end defined by a second radius, and a tubular body formed therebetween, said tubular body including a post-passing bore.

15. The vibration damping assembly of claim 11, wherein said post includes an attachment end attached to said component and an unattached end opposite said attachment end, said retention barb is formed on said unattached end.

16. The vibration damping assembly of claim 15, wherein said barb includes an upper edge that extends beyond said unattached end of said post.

17. The vibration damping assembly of claim 11, wherein said post has a shape, said shape being selected from the group consisting of round, triangular, oval, and D-shaped.

18. The vibration damping assembly of claim 11, wherein said spool-shaped isolator mounting grommet includes a body, said body being compressible, said body having an uncompressed diameter and a compressed diameter, said uncompressed diameter being greater than said compressed diameter, said C-shaped receptacle has an inner diameter, said uncompressed diameter of said body being greater than said inner diameter of said C-shaped receptacle.

19. The vibration damping assembly of claim 11, wherein said component is an air cleaner housing.

20. A vibration damping assembly for use with an automotive vehicle comprising:
    a bracket having a C-shaped receptacle;
    a component attachable to said bracket, said component including an integrally-formed post, said post including an end having a grommet retention barb integrally formed therewith, said barb including a ramped, grommet-passing surface, and
    a spool-shaped isolator mounting grommet attached to said post, said grommet including a body, said body having an uncompressed diameter and a compressed diameter, said
    uncompressed diameter being greater than said compressed diameter, said C-shaped receptacle having an inner diameter, said uncompressed diameter of said body being greater than said inner diameter of said C-shaped receptacle, wherein the post is a unitary solid structure that extends completely through the spool-shaped isolator mounting grommet.

* * * * *